United States Patent
Glunt et al.

[11] Patent Number: 5,718,460
[45] Date of Patent: Feb. 17, 1998

[54] FLANGE-LESS FLOW REDUCER FOR JOINING FLUID-FLOW COMPONENTS

[75] Inventors: P. Gordon Glunt, Kirkwood, Mo.; John C. Glunt, 1639 Forest Aire, Frontenac, Mo. 63131

[73] Assignees: John C. Glunt; Cyrus S. Blackmore, both of Frontenac, Mo.

[21] Appl. No.: 625,778

[22] Filed: Mar. 29, 1996

Related U.S. Application Data

[63] Continuation of Ser. No. 377,180, Jan. 23, 1995, abandoned.

[51] Int. Cl.$^6$ ............................................. F16L 55/00
[52] U.S. Cl. ........................ 285/176; 285/412; 285/177; 138/44; 403/337
[58] Field of Search ........................ 285/176, 177, 285/412, 414, 368; 403/299, 337; 138/44

[56] References Cited

U.S. PATENT DOCUMENTS

| | | | |
|---|---|---|---|
| 689,624 | 12/1901 | Ryan | 285/177 |
| 948,053 | 2/1910 | Horsley | 285/177 |
| 1,215,451 | 2/1917 | White | 285/176 |
| 2,438,472 | 3/1948 | Calcott | 285/414 |
| 2,974,684 | 3/1961 | Ginaven et al. | 285/177 |
| 3,366,145 | 1/1968 | Lohn | 285/177 |
| 4,648,631 | 3/1987 | Bryant | 285/177 |
| 5,236,228 | 8/1993 | Lawton . | |

FOREIGN PATENT DOCUMENTS

| | | | |
|---|---|---|---|
| 207296 | 10/1956 | Australia | 285/177 |
| 2556462 | 6/1977 | Germany | 285/177 |
| 93/13346 | 7/1993 | WIPO | 285/177 |

Primary Examiner—Terry Lee Melius
Assistant Examiner—Heather Shackelford
Attorney, Agent, or Firm—Armstrong, Teasdale, Schlafly & Davis

[57] ABSTRACT

Difference in internal diameters of flanged fluid-flow components, such as pumps and valves, are accommodated by the present flow adapter with a much lessened space requirement. The adapter is preferably formed as a metal casting with parallel faces, and with its tapered bore, which extends from one face to the other, surrounded by a pattern of tapped holes, into which the flanges of the fluid-flow components are screwed. No nuts are used; there is no need for access to the space occupied by the adapter, between the flanges of the two fluid-flow components. Results include a much lessened installation length with only a modest loss of fluid-flow efficiency.

8 Claims, 2 Drawing Sheets

FLANGE-LESS FLOW REDUCER FOR JOINING FLUID-FLOW COMPONENTS

This application is a continuation of application Ser. No. 08/377,180, filed Jan. 23, 1995, now abandoned.

BACKGROUND OF THE INVENTION

This invention relates to fluid-flow "reducers", as used to connect liquid flow components (e.g. pumps and valves) whose flanged outlets are of different interior diameter and may have a different number of bolt holes.

Apparatus including such liquid flow components may be assembled by the manufacturer as a "package". Whatever the "packaged" apparatus is, it is important that its exterior dimensions be minimized. As to large assemblies, the saving of six or eight inches in overall height (or length) may permit trucking the assembly on roads whose overpasses may otherwise be a limiting factor. In even small assemblies, the ability to move an assembly through an existing doorway may be critical.

The principal purpose of the present invention is to provide a space-saving flow-reducer to replace conventional "reducers", particularly for installations where compactness of the total assembly is more important than meeting theoretically ideal flow characteristics. A further purpose is to simplify the installation process, and in some instances to furnish greater rigidity to the assembled components.

SUMMARY OF THE INVENTION

Flow "reducers", are used to couple flanged fluid-flow components, such as pumps and valves, which have flow inlet or outlet bores of different sizes. While theoretical flow efficiency is better preserved by a gradual taper of the flow bore (as may be somewhat better provided by longer, conventional tubular "reducers" having flanges at both ends, the flanges having hole patterns to mate with the flanges at the inlet-outlet ends of such components), such achievement of theoretically better flow efficiency may be much less important than coupling the components as closely and rigidly as possible.

Our present invention provides a parallel-faced metal casting, bored to a varying diameter to serve the flow-reducing function in a length which may be substantially less than half that of conventional flanged flow adapters. In the opposite parallel walls of the casting are blind holes tapped to receive bolts, installed with their bolt heads on the flanges of the components, the bolts extending inward into the casting. The present invention eliminates use of nuts; there is no need for access to the space between the flanges of the two flow components so coupled.

According to standard practice, flanges of components to be connected will have either four, eight or twelve holes. Where the flanges of the two components have an equal number of holes but at different radii, the tapped holes in the opposite sides of the adapter will ordinarily correspond angularly with each other. However, even if the bolt-holes are deep compared to the thickness of the casting, the difference in the radial spacing may be sufficiently great (as in FIG. 1) that bolts entering from one face of the casting will not interfere with those entering from the opposite face. Where the flanges of the two components to be joined have an unequal number of holes, a sufficient angular spacing will exist between their hole patterns to avoid interference between the holes in the opposite parallel faces of the casting, and permit reducers of exceptional slenderness.

As compared with presently-existing tubular "reducers", the solidity of the present cast reducer serves to firmly support the components joined, as if they were integral. For weight saving, the exterior of the casting may have portions so "sculptured"—formed inward between the bolt holes—as to accommodate one or both of the bolt patterns in radially-outstanding lobes.

DESCRIPTION OF THE DRAWINGS

The drawings hereof show the position of a flow reducer embodying the present invention when used to communicate flow between a flanged component which has the smaller flow opening positioned above the adapter, and the component with the larger flow opening positioned below the reducer.

In the accompanying drawings.

DESCRIPTION OF THE PREFERRED EMBODIMENT

Figure 1:
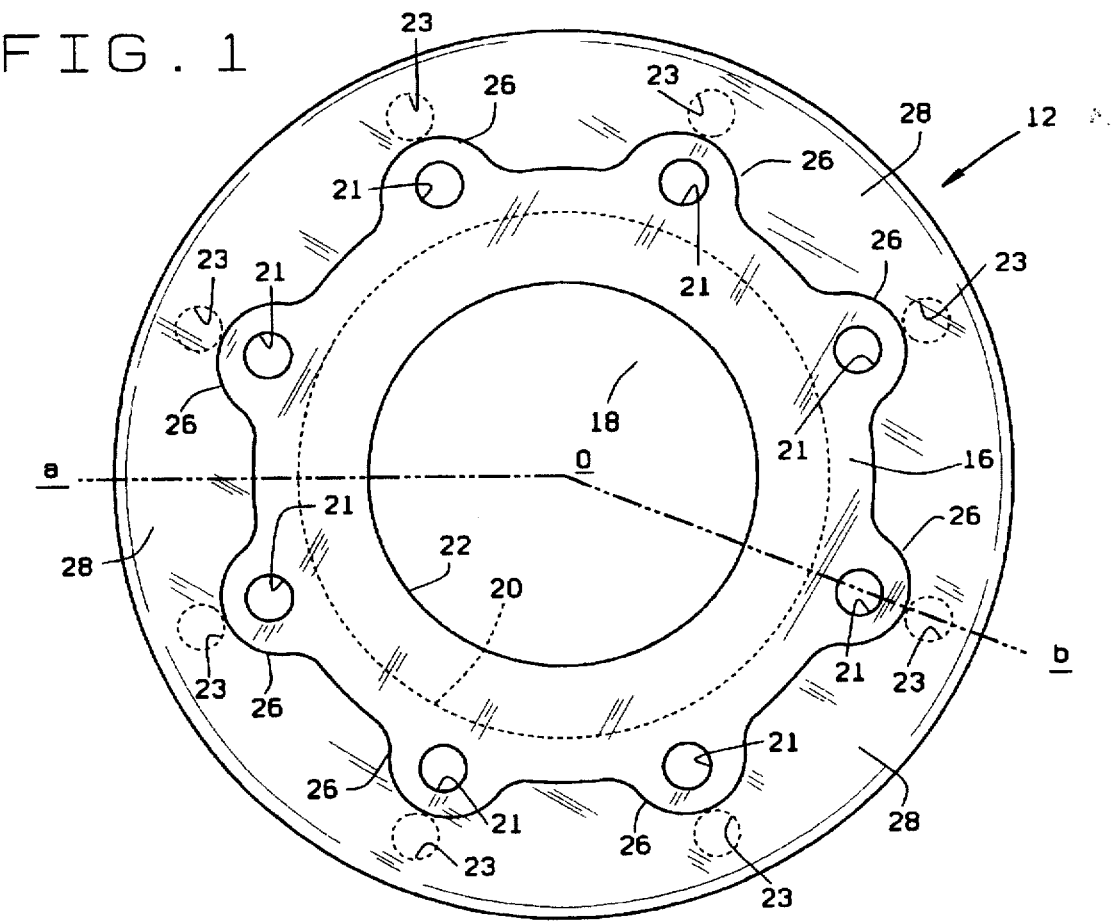
FIG. 1 is a view from above of a flow reducer embodying the present invention, as used to join unequal-diameter flanges of two flow components whose flanges have the same number of holes and the flanged component having the smaller flow opening is installed uppermost.
Figure 2:
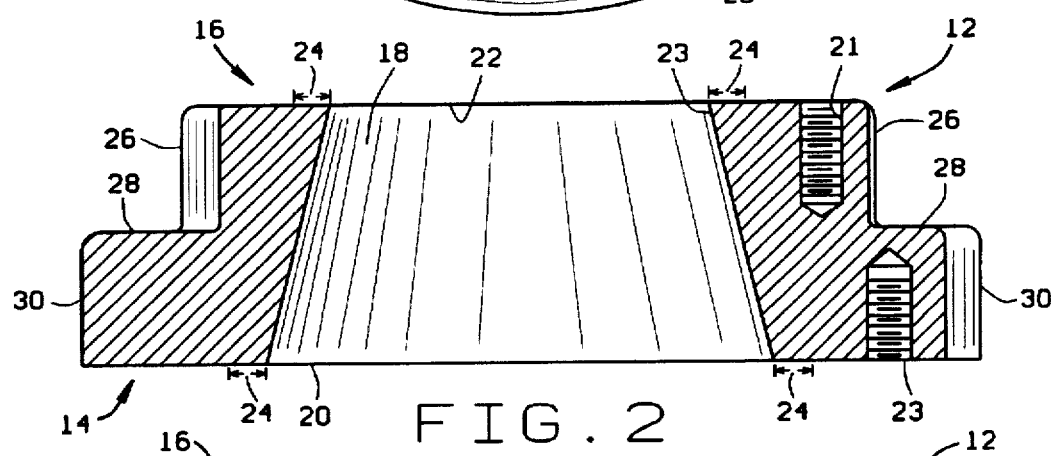
FIG. 2 is a sectional view taken along line a-o-b of FIG. 1.
Figure 3:
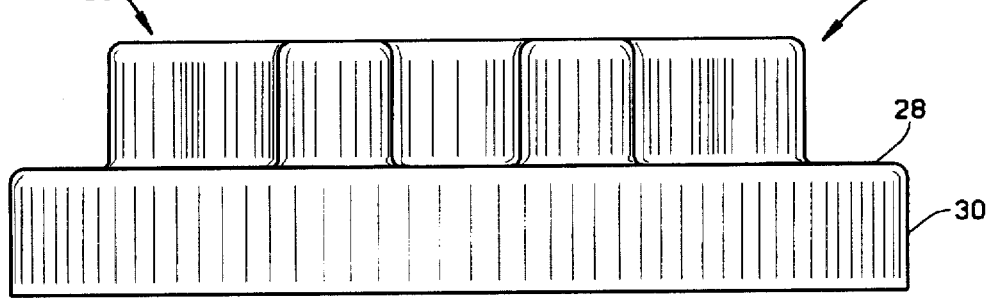
FIG. 3 is a side elevation of the adapter of FIGS. 1 and 2, showing upper portions of the adapter casting between adjacent tapped holes being formed inwardly to save weight.

The embodiment of invention illustrated in FIGS. 1–3 is representative of the situation where the flanges of each of the flow components to be joined has an equal number of holes, in this instance eight.

Instead of the conventional concentric reducer, which would have outstanding flanges to match the flanges of the components, in the present invention, as shown in FIGS. 1–3, we use an adapter, manufactured preferably of cast iron, which as illustrated may be a two-level body generally designated 12 having a larger end face generally designated 14 and a smaller end face generally designated 16 parallel thereto, the faces being connected by a tapered flow passage of chosen design (which instead might be tapered or include an orifice or a venturi or might be bell-shaped), generally designated 18 having in the larger end face 14 a larger passage opening 20 and in the smaller end face 16 a smaller flow opening 22, with circular gasket areas 24 of adequate width about the flow openings 20, 22.

Radially outward of the circular gasket areas 24 are drilled and tapped upper surface holes 21 and lower surface holes 23. In the embodiment illustrated, the thickness of the adapter is greater than the sum of bolt thread engagements in holes 21, 23, so there is no interference between bolts. However, if the difference in radial spacing of the holes 21, 23 results in no interference, the adapter thickness may be reduced to the required depth of holes 21 tapped from the smaller end face plus the thickness required to resist fluid pressure, corrosion and leakage past the gaskets installed in the gasket area 24 on the larger end face 16.

No similar problem attends the depth of holes 23 drilled into the larger surface 14. Thus, the holes 23 shown at the right side of FIG. 2 might penetrate the somewhat ring-like planar surface 28, without any danger of leakage.

Comparing the left and right sides of FIG. 2 (as taken along section lines a-o and o-b respectively), it is seen that the upper surface holes 21 are accommodated in lobes 26 which extend radially outward (as along line o-b of FIG. 1). These lobes adapt to standard circular flanges and serve to lighten the weight of the casting, but preferably end at about mid-depth of the casting; at this level a planar surface area 28 is provided, suitable for imprinting data indicating size, etc. Extending down from the outer edge of the surface 28 to the lower larger end face 24 is a generally cylindrical lower side surface 30.

Figure 4:
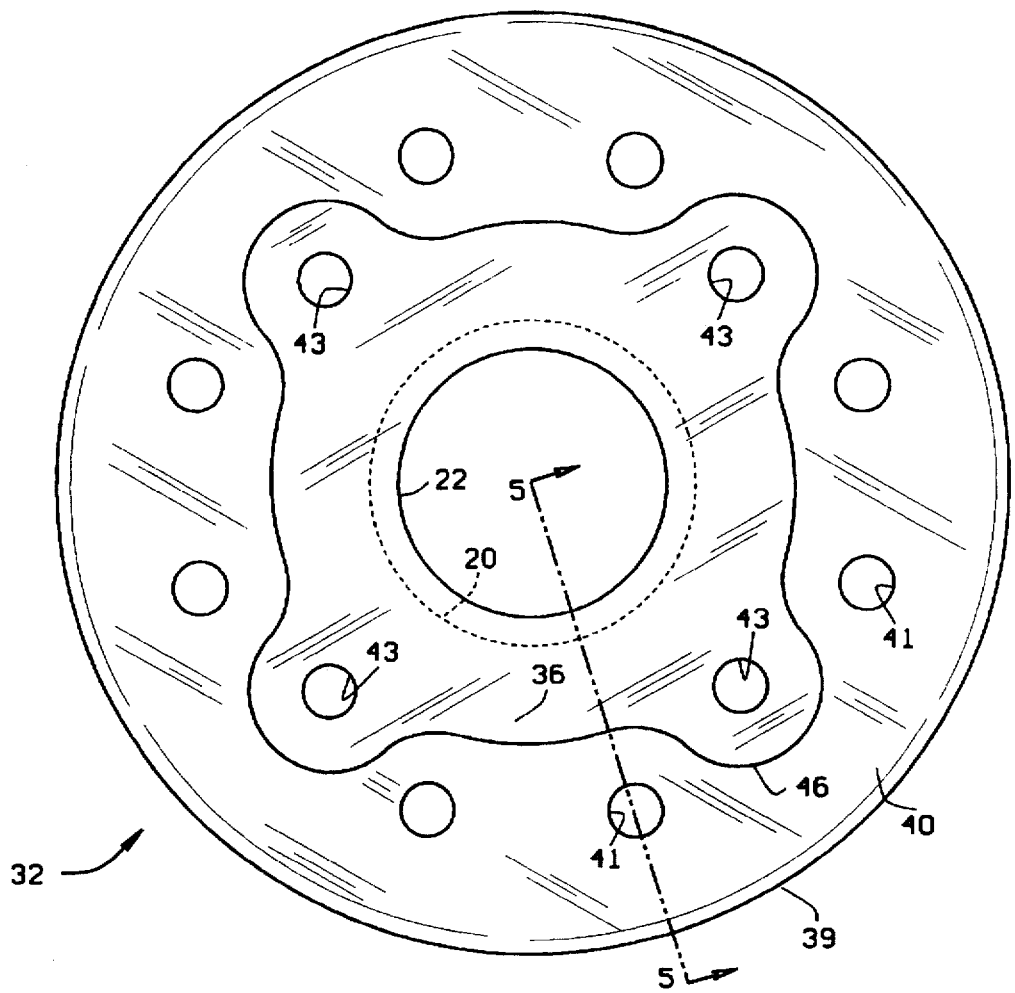
FIG. 4 is a view from above, similar to that of FIG. 1, of an adapter designed to adapt the flow between flanges of two components, wherein the flange of such upper component has four holes and the other has eight holes.
Figure 5:
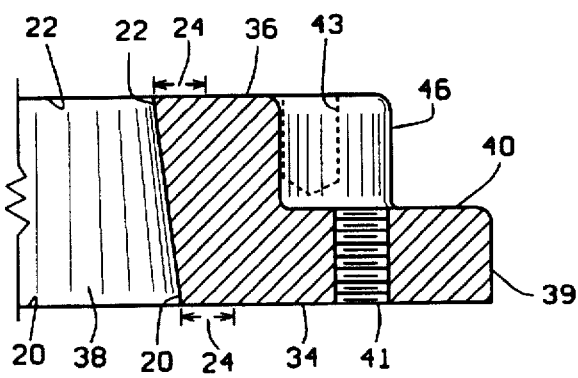
FIG. 5 is an annular sectional view taken along line 5—5 of FIG. 4, with one of the outer holes shown in section and one of the inner holes shown in hidden lines.

FIG. 4, taken together with its typical annular cross-sectional view FIG. 5, shows an adapter to be used to join flow-conducting components, one of whose flange has only four holes while the other has eight holes. FIG. 5 shows an annular cross-section taken along line 5—5 of FIG. 4. In these figures the flange of that component which mates with the upper surface 36 of the adapter has only four holes 43 spaced apart at 90°, whereas the flange of the component to join the lower side 34 has eight holes 41 spaced apart at 45°. As shown, none of the four flange holes of the upper component will be in angular alignment with the eight holes of the lower component. As seen in FIG. 5, the height of the lower level of the adapter (as measured by its cylindrical wall 39) may be less than the upper level (as seen by its lobe wall 46) so that, the eight tapped holes 41 may extend through the planar surface 40.

Except for that feature, the general organization of the adapter of FIGS. 4 and 5 is similar to that heretofore described for FIGS. 1–3. It has a two-level body generally designated 32 with a larger lower end face 34, presented downward, a smaller upper end face 36 parallel thereto, and a flow passage 38 of chosen design having its larger opening 20 in the body lower face 34 and its smaller opening 22 in the body upper face 36. Immediately surrounding these openings are flat areas 24 for installation of gaskets, similar to the areas 24 shown in FIG. 2.

The lower adapter portion (extending from about its mid-depth to its larger end face 34) is shown in FIGS. 4 and 5 to be cylindrical; it presents a short cylindrical outer wall 39 which terminates upwardly in a substantially mid-height planar surface 40 invaded by lobes 46 which accommodate screw holes 43 to attach the smaller-flanged component.

From the lower surfaces 3, 4 and extending, if need be, through the planar surface 40, the eight holes 41 are drilled at a 45° angular spacing. The lower portion terminates outwardly in an outer cylindrical surface 50.

From FIG. 4, the difference in angular spacings of the lower surface holes 41 from the upper surface holes 43 (seen in FIG. 5 in hidden lines) avoids any interference between them. Accordingly, the adapter thickness may be reduced to less than that shown (with some impairment of fluid flow efficiency). The minimum thickness is equal to the required depth of the upper level holes 43 plus the thickness required to resist fluid pressure, corrosion and leakage from the gasket area (not indicated) around the larger opening 20 of the flow passage 18.

In use, a substantial amount of space is saved by use of an adapter of the present design, as compared with a conventional flanged flow reducer in typical installations, the saving is half or more of height required. Further, the fact that no nuts are utilized make it unnecessary to obtain access to the space between the lower and the upper faces of the adapter; whereas in a conventional reducer, it is necessary to work in this space to affix and remove nuts.

While the present adapter has been described as being typically cast iron, any material of adequate strength and compatible with the fluid-flow may be utilized.

Throughout this application and claims, references to a circular pattern of holes shall mean patterns whose holes are equidistant from a common center. The terms "larger end face" and "smaller end face" as used in the claims means the effective area of such end faces, that is the portions including and inward of the pattern of holes therein. The term "bolts" includes cap screws.

We claim:

1. For joining two fluid-flow conducting components having unequal sized end flanges penetrated by an equal number of holes, that component having the larger size flange also having a larger flow opening than the other such component, the invention comprising:

a flow reducer having a body including end faces parallel to each other and a flow passage therebetween of such varying diameter as to fit the flow openings of such components, one of said end faces having, adjacent to its outer edge and equally spaced radially from the axis of fluid flow and at equal angular spacing from each other, a plurality of tapped threaded holes extending perpendicularly inward from said face in a pattern which fits that of such larger size flange, and the other said end face having, equally spaced angularly from each other and at a radially lesser distance from the axis of fluid flow, the same number of tapped threaded holes extending perpendicularly inward from said face, but not through the body, in a pattern which fits that of such smaller size flange, whereby to avoid or lessen interference between said holes in the opposite faces.

2. A reducer as defined in claim 1, wherein a circular area of each of said end faces is provided outward of said flow passage and inward of said plurality of holes, whereby to accommodate in each said area a gasket for sealing of the reducer against one of such component end flanges.

3. A reducer as defined in claim 1, wherein the thickness of said reducer between its said end faces is greater than the combined depths of one tapped hole in each face of said reducer.

4. A reducer as defined in claim 1, wherein the thickness of said reducer between its said end faces is in excess of the combined depths of one hole in each face of said reducer, whereby said holes are blind.

5. A reducer as defined in claim 1, wherein at angular spacings intermediate said holes, portions of the body are of lesser radial extent than its extent at the angles at which said holes are located, whereby to lessen the weight of the body.

6. For joining two fluid-flow conducting components having unequal sized end flanges penetrated by an unequal number of holes, that component having the larger size end flange also having both the greater number of holes and a larger flow opening, the invention comprising:

a flow reducer having a body characterized by a larger end face and a smaller end face parallel to each other, and a tapered flow passage therebetween terminating in flow openings in said faces, said larger end face having, equally spaced radially from the axis of fluid flow, a plurality of tapped threaded holes extending perpendicularly inward into said face, said smaller end face having, equally spaced from the axis of fluid flow at a radially lesser distance from the axis of fluid flow than said holes in the larger end face, a lesser number of tapped threaded holes extending perpendicularly inward into said smaller end face, the thickness of the reducer being greater than the required depth of holes tapped in the smaller end face, said lesser number of holes being in a circular pattern in which none of said holes are in angular alignment with any of the holes in said larger end face, whereby such lack of angular correspondence assures against interference between said patterns of holes in the opposite faces.

7. A reducer as defined in claim 6, wherein a circular area of each of said of said end faces is provided between its said tapped holes and said flow passage, whereby to accommodate a gasket for sealing of the reducer against one of such component end flanges.

8. For transmitting fluid flow between a first fluid flow component having a smaller flow opening surrounded by an end flange and a second fluid flow component having a larger flow opening surrounded by a diametrically-larger end flange, a flow reducer comprising a two-level body formed about a central axis and having two parallel end surfaces, said first end surface having a smaller flow opening and a plurality of radially-outward lobes, which extend to substantially mid-depth of the reducer, each of said lobes having a tapped bore, and said second end surface being substantially circular and larger than said first end surface and having a larger flow opening and a plurality of tapped holes thereabout whose number and pattern fits the number and pattern of such second flow component, said flow reducer further having at substantially mid-depth a ring-like planar surface whose outer outline is substantially the same as the outline of said second end surface, and having an inner outline at which said lobes terminate, further having a generally cylindrical side surface between said second end surface and said mid-depth surface.

* * * * *